(12) United States Patent
Howard

(10) Patent No.: US 10,368,483 B1
(45) Date of Patent: Aug. 6, 2019

(54) TURFGRASS BRUSHING ASSEMBLY AND SYSTEM

(71) Applicant: Harold F. Howard, Phoenix, AZ (US)

(72) Inventor: Harold F. Howard, Phoenix, AZ (US)

( * ) Notice: Subject to any disclaimer, the term of this patent is extended or adjusted under 35 U.S.C. 154(b) by 641 days.

(21) Appl. No.: 14/880,941

(22) Filed: Oct. 12, 2015

Related U.S. Application Data

(60) Provisional application No. 62/063,687, filed on Oct. 14, 2014.

(51) Int. Cl.
*A01D 34/00* (2006.01)

(52) U.S. Cl.
CPC .................. *A01D 34/001* (2013.01)

(58) Field of Classification Search
CPC ...... A01B 45/00; A01B 45/02; A01D 34/001; A01D 42/06; A01D 34/835; A01G 20/43; A01G 20/47; A01G 20/00
See application file for complete search history.

(56) References Cited

U.S. PATENT DOCUMENTS

| | | | | |
|---|---|---|---|---|
| 1,168,713 A | * | 1/1916 | Cummins | E01C 19/264 15/79.1 |
| 1,566,194 A | * | 12/1925 | Freeman | E01H 1/02 15/78 |
| 1,674,306 A | * | 6/1928 | Shaw | A01D 76/006 15/78 |
| 1,757,844 A | * | 5/1930 | Pol | A01D 57/01 56/249 |
| 2,268,250 A | * | 12/1941 | Gormley | A01G 20/43 56/400.14 |
| 2,300,192 A | * | 10/1942 | Allen | E01C 19/264 15/78 |
| 2,962,946 A | * | 12/1960 | Neff | E01C 19/15 15/78 |
| 2,973,535 A | * | 3/1961 | Olay | A46B 3/00 15/78 |
| 3,525,201 A | * | 8/1970 | Kaufman | A01D 34/42 56/7 |
| 4,747,174 A | * | 5/1988 | Hightower | E01H 1/02 15/201 |

(Continued)

FOREIGN PATENT DOCUMENTS

GB         106105 A   *  5/1917  ............ E01H 1/045

*Primary Examiner* — Thomas B Will
*Assistant Examiner* — Joan D Misa
(74) *Attorney, Agent, or Firm* — Booth Udall Fuller, PLC

(57) ABSTRACT

This application describes a turfgrass mowing system having one or more turfgrass mower cutting units and one or more turfgrass brushing assemblies. The turfgrass brushing assemblies are pivotally coupled to the turfgrass mower cutting units with a pivot coupling on a frame assembly of the turfgrass mower cutting units. The turfgrass brushing assemblies include a brush holder assembly coupled to the frame assembly with a vertically adjustable coupling, an angle adjustable coupling, or both. A brush is coupled to the brush holder assembly of each turfgrass brushing assemblies. With the turfgrass brushing assemblies pivotally coupled to the turfgrass mower cutting units, a user may brush turfgrass with the turfgrass system to stand the turfgrass upright immediately before cutting the turfgrass with the turfgrass mower cutting unit, thus improving the cut of the turfgrass.

8 Claims, 6 Drawing Sheets

(56) References Cited

U.S. PATENT DOCUMENTS

| | | | | |
|---|---|---|---|---|
| 4,989,676 | A * | 2/1991 | Rogers | A01D 42/06 |
| | | | | 111/197 |
| 5,182,830 | A * | 2/1993 | Viola | E01H 1/02 |
| | | | | 15/160 |
| 5,477,927 | A * | 12/1995 | Figura | A01B 45/02 |
| | | | | 172/29 |
| 5,833,013 | A * | 11/1998 | Davis | A01B 45/02 |
| | | | | 172/612 |
| 6,088,865 | A * | 7/2000 | Truan | E01H 1/02 |
| | | | | 15/190 |
| 6,655,469 | B1 * | 12/2003 | Davis | A01B 19/02 |
| | | | | 172/142 |
| D514,597 | S * | 2/2006 | Lynch | D15/27 |
| 7,065,947 | B1 * | 6/2006 | Street | A01B 45/00 |
| | | | | 172/29 |
| 7,069,711 | B1 * | 7/2006 | Connell | A01B 45/00 |
| | | | | 56/16.7 |
| 8,220,240 | B2 * | 7/2012 | Tielburger | A01D 43/02 |
| | | | | 56/193 |
| 9,371,617 | B2 * | 6/2016 | Thunstrom | E01C 23/06 |
| 9,839,176 | B1 * | 12/2017 | Snyder | A01B 76/00 |
| 2003/0230067 | A1 * | 12/2003 | Weinlader | A01D 43/00 |
| | | | | 56/320.1 |
| 2006/0123760 | A1 * | 6/2006 | Glasscock | A01D 34/67 |
| | | | | 56/17.3 |
| 2012/0096661 | A1 * | 4/2012 | Pizano | A46B 9/02 |
| | | | | 15/160 |
| 2014/0262386 | A1 * | 9/2014 | Davis | A01B 45/00 |
| | | | | 172/612 |
| 2015/0201554 | A1 * | 7/2015 | McCarthy | A01D 34/001 |
| | | | | 56/14.7 |

\* cited by examiner

TURFGRASS BRUSHING ASSEMBLY AND SYSTEM

CROSS REFERENCE TO RELATED APPLICATIONS

This document claims the benefit of the filing date of U.S. Provisional Patent Application 62/063,687, entitled "LAWN BRUSHING SYSTEM" to Howard, which was filed on Oct. 14, 2014, the contents of which are hereby incorporated by reference.

BACKGROUND

1. Technical Field

Aspects of this document relate generally to turfgrass brushing systems.

2. Background Art

The efficiency of turfgrass mower cutting units is often reduced by debris and positioning of the grass blades. Turfgrass plants have a genetic tendency to orient their leaf blades diagonally or even horizontally. When a turfgrass mower cutting unit passes over the bent grass, the turfgrass mower cutting unit may not cut the turfgrass because the turfgrass is bent over.

SUMMARY

According to one aspect, a turfgrass brushing assembly comprises a frame assembly and a brush holder assembly. The frame assembly is configured to removably couple to a mower cutting unit and comprises one or more pivot couplings configured to pivotally couple the turfgrass brushing assembly to the mower cutting unit. The brush holder assembly is adjustably coupled to the frame assembly and comprises brush block coupling configured to couple to a brush.

Various implementations and embodiments may comprise one or more of the following. A brush removably coupled to the brush block coupling, the brush holder assembly further comprising one or more swivel blocks coupled to the brush block coupling and pivotally coupled to the frame assembly. The one or more swivel blocks may comprise two swivel blocks each pivotally coupled to a different vertical adjuster of two vertical adjusters, each of the two vertical adjusters being removably coupled to a cross member of the frame assembly with a coupling extending through one of a plurality of holes positioned to allow a user to vertically adjust a height of the vertical adjuster and the brush holder assembly by extending the coupling through one of the plurality of holes. An angle adjustment assembly coupled to the brush holder assembly and the frame assembly, the angle adjustment assembly being configured to adjust a relative angle of the brush. The frame assembly may further comprise two opposing side plates each coupled to a different end of the cross member, each side plate of the two opposing side plates being coupled to a different one of the two pivot couplings configured to pivotally couple to a mower cutting unit. Each pivot coupling may comprise a bushing and the frame assembly may comprise a bumper coupled to each side plate. The angle adjustment assembly may comprise: a pivot channel coupled to the brush block coupling of the brush holder assembly; a linkage arm pivotally coupled to the pivot channel at a first end of the linkage arm, the linkage arm comprising a plurality of holes distal the first end of the linkage arm; and a fork coupled to the cross member of the of the frame assembly and removably coupled to the linkage arm with a pin that extends through a portion of the fork and through one of a plurality of holes on the linkage arm, wherein the relative angle of the brush is adjusted responsive to extending the pin through different holes of the plurality of holes of the linkage arm. The brush block coupling may comprise a U-shaped bracket, and the brush may be coupled to the U-shaped bracket with one or more brush pins.

According to another aspect, a turfgrass mowing system comprises one or more turfgrass mower cutting units and one or more turfgrass brushing assemblies. Each of the one or more turfgrass brushing assemblies are coupled to a different one of the one or more turfgrass mower cutting units and comprise a frame assembly comprising one or more pivot couplings configured to pivotally couple the turfgrass brushing assembly to the mower cutting unit, a brush holder assembly adjustably coupled to the frame assembly, and a brush coupled to the brush holder assembly.

Various implementations and embodiments may comprise one or more of the following. The one or more turfgrass mower cutting units may comprise a plurality of turfgrass mower cutting units, and the one more turfgrass brushing assemblies may comprise a plurality of turfgrass brushing assemblies each removably coupled to a different one of the plurality of mower cutting units. The brush holder assembly of each turfgrass brush assembly may comprise a brush block coupling and one or more swivel blocks coupled to the brush block coupling and pivotally coupled to the frame assembly. The one or more swivel blocks of each turfgrass brush assembly may comprise two swivel blocks each pivotally coupled to a different vertical adjuster of two vertical adjusters of each turfgrass brush assembly, each of the two vertical adjusters of each turfgrass brush assembly being removably coupled to a cross member of the frame assembly of each turfgrass brush assembly with a coupling extending through one of a plurality of holes in the vertical adjuster positioned to allow a user to vertically adjust a height of the vertical adjuster and the brush holder assembly by extending the coupling through one of the plurality of holes. Each turfgrass brush assembly may comprise an angle adjustment assembly coupled to the brush holder assembly and the frame assembly, the angle adjustment assembly being configured to adjust a relative angle of the brush. The frame assembly of each turfgrass brush assembly may comprise two opposing side plates each coupled to a different end of the cross member, each side plate of the two opposing side plates being coupled to a different one of the two pivot couplings configured to pivotally couple to a mower cutting unit. Each pivot coupling of each turfgrass brush assembly may comprise a bushing pivotally seated within a yoke of one turfgrass mower cutting unit of the plurality of turfgrass mower cutting units, and the frame assembly of each turfgrass brush assembly further comprises a bumper coupled to each side plate. The angle adjustment assembly of each turfgrass brush assembly may comprise: a pivot channel coupled to the brush block coupling of the brush holder assembly, a linkage arm pivotally coupled to the pivot channel at a first end of the linkage arm, the linkage arm comprising a plurality of holes distal the first end of the linkage arm, and a fork coupled to the cross member of the of the frame assembly and removably coupled to the linkage arm with a pin that extends through a portion of the fork and through one of a plurality of holes on the linkage arm, wherein the relative angle of the brush is adjusted responsive to extending the pin through different holes of the plurality of holes of the linkage arm.

According to another aspect, a method of brushing turfgrass comprises pivotally coupling one or more turfgrass brushing assemblies to one or more turfgrass cutting units in front of the one or more turfgrass cutting units with one or more pivot couplings on a frame assembly of each of the one or more turfgrass brush assemblies, and pushing the one or more turfgrass brushing assemblies across turfgrass by pushing the one or more turfgrass cutting units to brush the turfgrass with one or more brushes, each of the one or more brushes being coupled to a brush holder assembly adjustably coupled to the frame assembly of a different one of the one or more turfgrass brushing assemblies.

Various implementations and embodiments may comprise one or more of the following. Vertically adjusting a height of the turfgrass brush of each turfgrass brushing assembly by removing a coupling from one hole of a plurality of holes on a vertical adjuster pivotally coupled to the brush holder assembly and inserting the coupling into a different one of the plurality of holes of the vertical adjuster to couple the vertical adjuster and the brush holder assembly to the frame assembly. Adjusting an angle of the brush holder assembly of the turfgrass brushing assembly by removing a coupling from one hole of a plurality of holes in a linkage arm and a fork coupled to the frame assembly, the linkage arm being pivotally coupled to the brush holder assembly distal the plurality of holes in the linkage arm, and inserting the coupling through the fork and a different hole of the plurality of holes of the linkage arm. Adjusting a height of the turfgrass brushing assembly by detaching the pivot coupling from one hole of a plurality of holes on a side plate of the frame assembly, and reattaching the pivot coupling to a different hole of the plurality of holes on the side plate of the frame assembly. Pivotally coupling the one or more turfgrass brushing assemblies to the one or more turfgrass cutting units in front of the one or more turfgrass cutting units with the one or more pivot couplings on the frame assembly of each of the one or more turfgrass brushing assemblies may comprise inserting opposing bushings of the one or more turfgrass brushing assemblies into two opposing yokes of the one or more turfgrass cutting units. The one or more turfgrass mower cutting units may comprise a plurality of turfgrass mower cutting units and the one more turfgrass brushing assemblies comprise a plurality of turfgrass brushing assemblies each removably coupled to a different one of the plurality of mower cutting units.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended turfgrass brushing device and/or assembly procedures for a turfgrass brushing assembly will become apparent for use with implementations of turfgrass brushing assembly from this disclosure. Accordingly, for example, although particular assemblies are disclosed, such assemblies and implementing components may comprise any shape, size, style, type, model, version, measurement, concentration, material, quantity, and/or the like as is known in the art for such turfgrass brushing assembly and implementing components, consistent with the intended operation of a turfgrass brushing assembly.

Turfgrass plants have a genetic tendency to orient their leaf blades diagonally or even horizontally. Hence, the leaf blades may be very much longer than the cutting height setting on the cutting units. As an athletic surface, the turf performance would be dramatically improved if the leaf blades are stood up vertically as the cutting units pass by. The resulting leaf blades are much shorter and substantially vertical. Various embodiments contemplated in this disclosure are configured to stand the long leaves of turfgrass up vertically a fraction of a second before the turfgrass is clipped by the cutting unit. During the fraction of a second, the leaf blades do not have time to revert back to the generally horizontal or sloped orientation. Contemplated in this disclosure are one or more turfgrass brushing assemblies configured to couple to an individual turfgrass cutting or mowing unit and/or supporting framework thereof. Embodiments of a turfgrass brushing assembly according to this disclosure are configured to brush turf immediately in advance of the cutting of turfgrass by the individual cutting unit. A large mower may have multiple cutting units attached to one traction machine. Hence, such a multiple-cutting-unit machine may have multiple turfgrass brushing assemblies coupled thereto, one for each cutting unit. In one or more embodiments, a turfgrass brushing assembly brushes turfgrass immediately in advance of the turfgrass's cutting. In doing so, horizontal turfgrass leaves are brushed into a vertical orientation so that the cutting unit is able to cut them cleanly before the leaves have an opportunity to relax back to a horizontal orientation. The result is a turfgrass stand consisting of short leaves with a vertical orientation.

Figure 1:
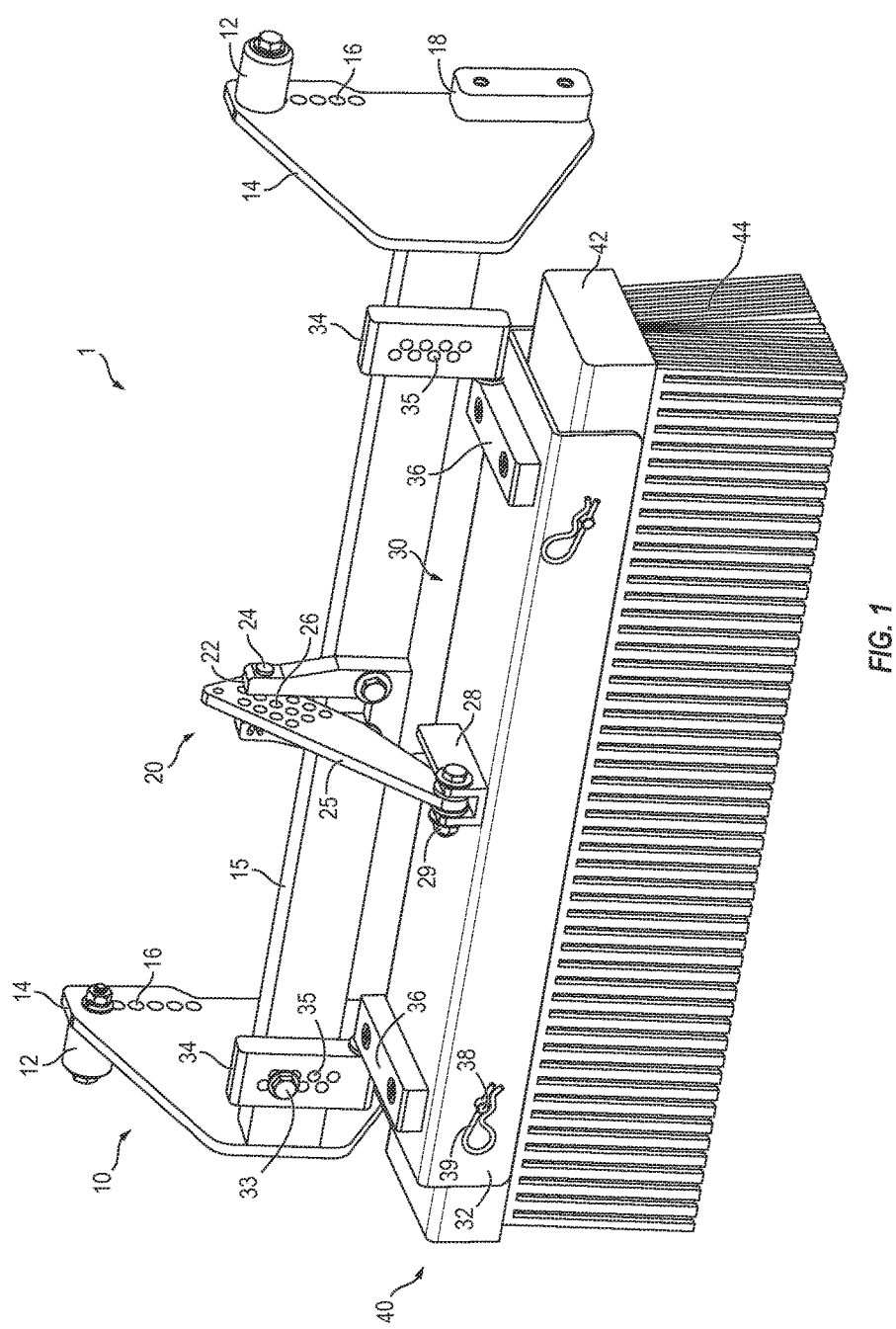
FIG. 1 is perspective view of a first embodiment of a turfgrass brushing assembly.
Figure 2:
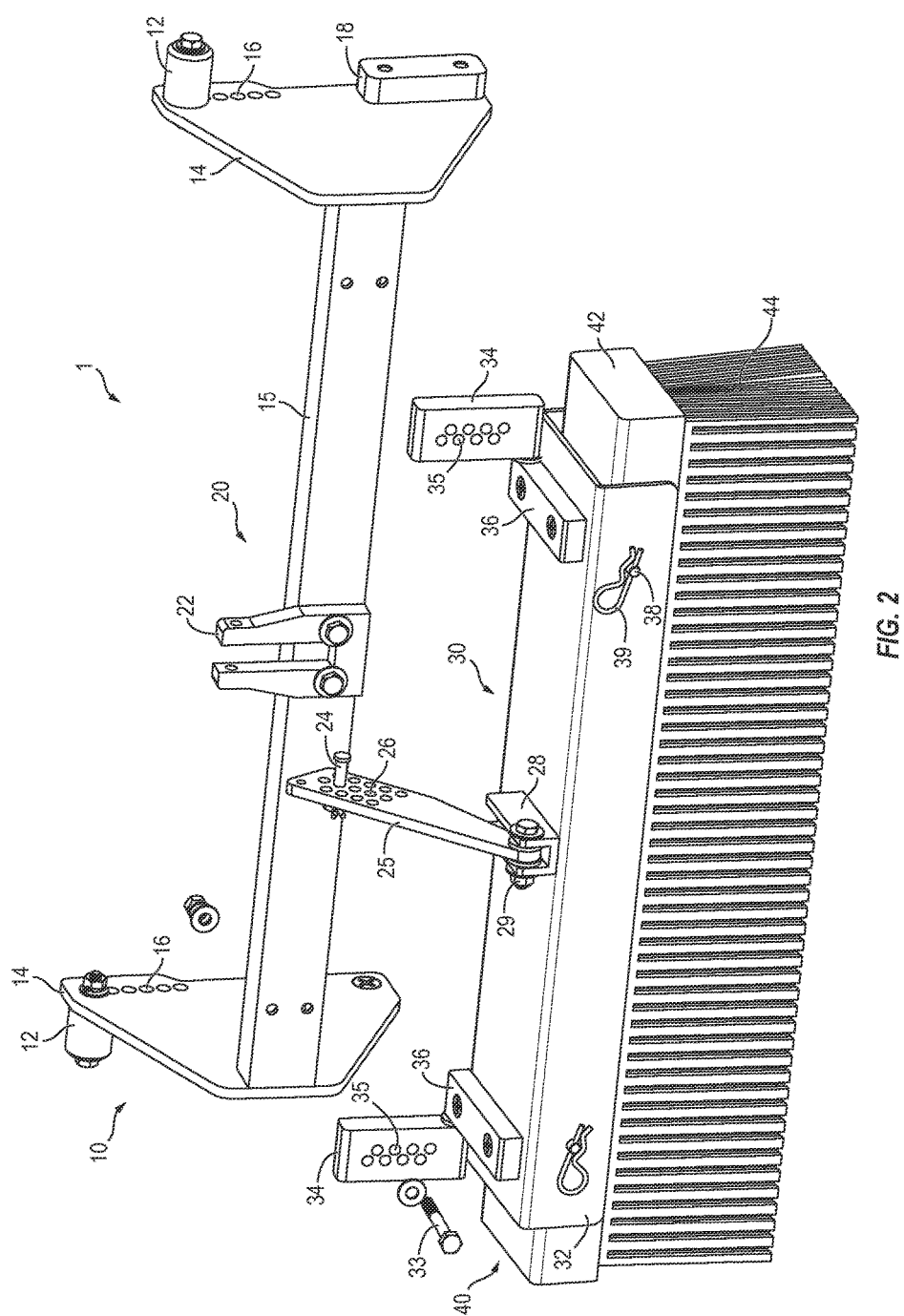
FIG. 2 is an exploded view of a first embodiment of a turfgrass brushing assembly.
Figure 6:
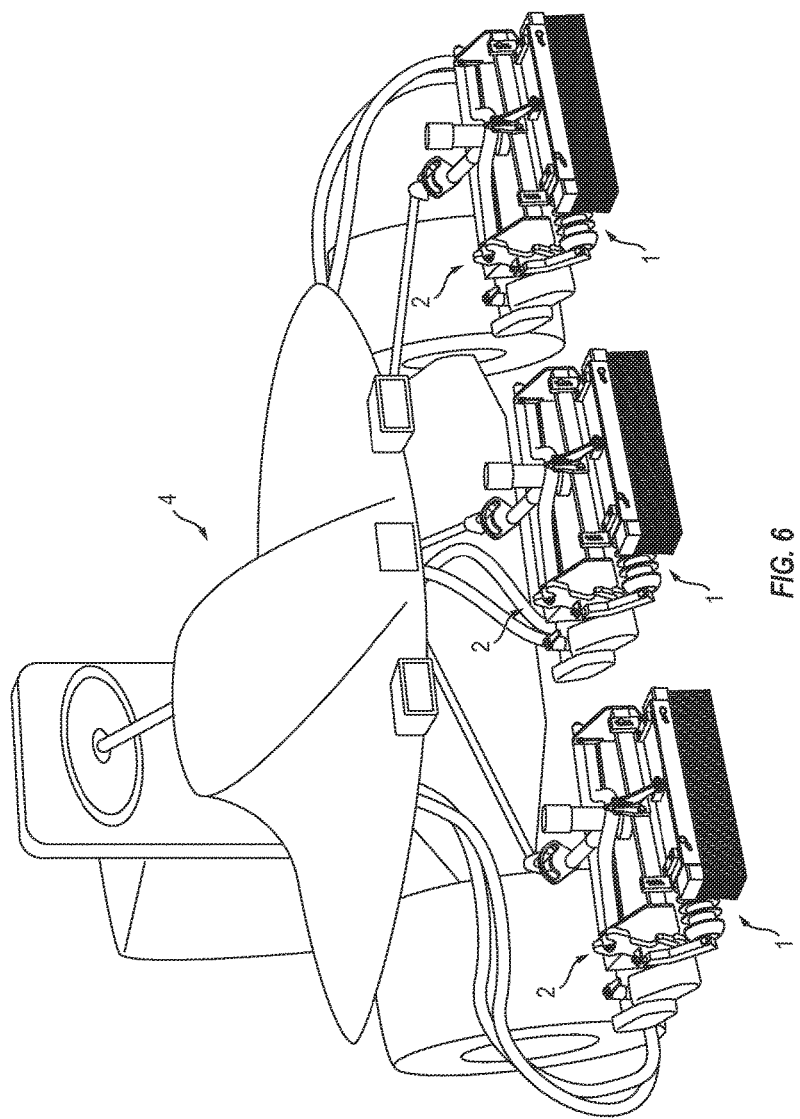
FIG. 6 is a perspective view of a plurality of first embodiments of a turfgrass brushing assembly coupled to a plurality of turfgrass mower cutting units being pushed by a turfgrass tractor.

According to some aspects, a turfgrass brushing assembly 1 comprises a frame assembly 10 and a brush holder assembly 30. FIG. 1 depicts a non-limiting embodiment of a turfgrass brushing assembly 1, and FIG. 2 depicts an exploded view of the non-limiting embodiment of FIG. 1. According to some aspects, a frame assembly 10 is configured to removably couple to a mower cutting unit 2 (shown in FIGS. 3 and 6) and the brush 40 is removably and pivotally coupled to the frame assembly 10. In more particular embodiments, the brush 40 may be removably coupled to a brush holder assembly 30 and the brush holder assembly 30 is pivotally coupled to the frame assembly 10.

In one or more embodiments, a frame assembly 10 of a turfgrass brushing assembly 1 comprises a cross member 15 and two opposing side plates 14 each coupled to a different end of the cross member. The side plates 14 are configured to removably couple to a mower cutting unit 2 with a pivot coupling 12, and the cross member 15 is configured to removably couple to one or more vertical adjustors 34. According to some aspects, a cross member 15 and side plates 14 are welded to form one solid component. In other embodiments, the cross member 15 may be removably coupled to the side plates 14.

In some embodiments, the side plates 14 are configured to removably couple to a mower cutting unit 2. According to some aspects, the side plates 14 are configured to pivotally couple to the mower cutting unit 2 or associated framework. More particularly, each side plate may comprise a plurality of holes 16 through which a pivot coupling 12 extends to pivotally couple the frame assembly to a mower cutting unit 2. According to some aspects, the pivot couplings 12 comprise solid cylindrical pivot couplings 12 bolted or otherwise coupled to the side plates 14 of the frame assembly 10. More particularly, the pivot couplings 12 may comprise a cylindrical pivot coupling comprising either metal or polyoxymethylene. The turfgrass brushing assembly 1 may be mounted to a mower cutting unit 2 by inserting the pivot couplings 15 into either existing yokes 3 (shown in FIG. 3) or mounts in the mower cutting unit 2 or its associated framework. In other embodiments, a turfgrass brushing assembly 1 may pivotally couple to tubes comprising opposing open ends on the mower cutting unit 2. When pivotally mounted to a yoke 3, tubes, or mounts on a mower cutting unit, a turfgrass brushing assembly 1 is then able to pivot relative to the mower cutting unit 2 by pivoting about the pivot couplings 12. A turfgrass brushing assembly 1 may be adjusted vertically relative to the mower cutting units 2 by selecting among the available holes 16 in the side plates 14. In one or more embodiments, a turfgrass brushing assembly may further comprise a locking element. The locking element comprises a hole sized to receive the pivot coupling 52 and may be coupled to either the frame assembly 10 or the turfgrass mower cutting unit 2 to prevent the pivot coupling from removing from the yoke 3.

In one or more embodiments, each side plate 14 comprises one or more bumpers 18 or contact points. These bumpers 18 or contact points are positioned on the side plates 14 to interface a portion of the mower cutting unit 2 and hold the frame assembly 10 in a stable position while the mower cutting unit 2 pushes the frame assembly 10 and brush 40 forward as the mower cutting unit 2 is moving. Thus, the mower cutting unit 2 is able to float largely independent of the turfgrass brushing assembly 1 while it is pushing the frame assembly 10 and brush 40 forward. When the mower cutting units 2 are retracted for transport, the turfgrass brushing assembly 1 also retracts along with the mower cutting units 2. According to some aspects, the bumpers 18 comprise polyoxymethylene material.

One or more vertical adjustors 34 may be removably coupled to the cross member 15 with bolts 33, screws, pins, or any other coupling known in the art. According to some aspects, each vertical adjustor 34 comprises plurality of holes 35 extending through each vertical adjustor 34. The plurality of holes 35 on the vertical adjustor 34 allow a user to adjust the height of the brush 40 relative to the frame assembly 10, thus vertically adjusting the height of the brush 40 coupled to the turfgrass brushing assembly 1. For example, a user may select a predetermined hole of the plurality of holes 35 on the vertical adjustor 34 to extend the bolt 33 or other coupling through the vertical adjustor 34 to couple the vertical adjustor 34 to the cross member 15. In some embodiments, the bolt 33 also extends through a hole on the cross member 15. It is also contemplated that two or more bolts 33 or other couplings may be used to couple each vertical adjustor 34 to the cross member 15, as depicted in the non-limiting embodiment of FIGS. 1 and 2.

As noted above, embodiments of a turfgrass brushing assembly 1 may comprise a brush holder assembly 30 pivotally coupled to the frame assembly 10. According to some aspects, a brush holder assembly 30 comprises a brush block coupling 32 and one or more swivel blocks 36 coupled to the brush block coupling 32. The brush block coupling 32 is configured to removably couple to a brush block 42 of the brush 40. More particularly, the brush block coupling 32 may comprise a channel or U-shaped bracket such as but not limited to an aluminum channel. The channel is sized to position a block 42 of the brush 40 within the channel. According to some aspects, one or more brush holding pins 38 couple the brush block 42 to the channel. For example, one or more brush holding pins 38 may be inserted through holes in the channel, passed through holes in the block 42 of the brush 40, and retained in place with retention clips 39. In other embodiments, the block 42 of the brush 40 may be coupled to the channel or the brush block coupling 32 with other couplings known in the art, such as but not limited to screws, bolts, and the like. These various configurations allow for easy removal and replacement of the brush 40.

In some embodiments, one or more swivel blocks 36 coupled to the brush block coupling 32 pivotally couple the brush holder assembly 30 to the frame assembly 10. More particularly, the one or more swivel blocks 36 may comprise two swivel blocks 36 each pivotally coupled to a different vertical adjuster 34 of the frame assembly 10. Even more particularly, each swivel block 36 may be pivotally coupled to the vertical adjustor 35 with a dowel pin inserted into a hole in the respective vertical adjustor 34 and respective swivel block 36. Such a configuration allows the brush holder assembly 30 to swivel or pivot relative to the frame assembly 10 via rotation about the dowel pins.

One or more embodiments of a turfgrass brushing assembly 1 comprise an angle adjustment assembly 20. The angle adjustment assembly 20 is configured to adjust a relative angle of the brush 40 of the turfgrass brushing assembly land may be coupled to the brush holder assembly 30 and the frame assembly 10. According to some aspects, the angle adjustment assembly 20 comprises a pivot channel 28 coupled to the brush block coupling 32 of the brush holder assembly 30, a linkage arm 25 pivotally coupled to the pivot channel 28 at a first end of the linkage arm 25, and a fork 22 coupled to the cross member 15 or other portions of the frame assembly 10 and pivotally coupled to the linkage arm 25. In some embodiments, the linkage arm 25 is removably coupled to the fork 22 with a pin 24 that extends through a portion of the fork 22 and through one of a plurality of holes 26 on the linkage arm 25. With such coupling, the relative angle of the brush 40 may be adjusted responsive to extending the pin 24 through different holes 26 of the plurality of holes 26 on the linkage arm 25. The linkage arm 25 may be coupled to the pivot channel 28 via a loose-fitting bolt 29 or any other coupling known in the art such that the linkage arm 25 is able to swivel relative to the brush holder assembly 30. For example, once a desired angle position of the brush holder assembly 30 relative to the frame assembly 10 is selected, the two assemblies may be held in that relative position by inserting a pin 24 through a hole in the top of the fork 22 and through a selected hole 26 in the linkage arm 25.

In one or more embodiments, the turfgrass brushing assembly 1 comprises a brush 40 comprising a brush block 42 and bristles 44. The brush block may comprise either solid wood or plastic. According to some aspects, the brush assembly 40 may be adapted specifically to the brushing needs of the turfgrass by varying the mounting pattern of the bristles 44 in the block 42, the length of the bristles 44, the shape of the bristles 42, and the material composition of the bristles 44. Furthermore, a wide array of brush styles may be utilized in different embodiments of a turfgrass brushing assembly. The operator or user is thus able to select the proper aggressiveness of a brush to match the prevailing management needs of the turfgrass. In addition to mere brushing, in some embodiments the bristles 44 are configured to scratch the turfgrass surface and remove plant material.

Figure 3:
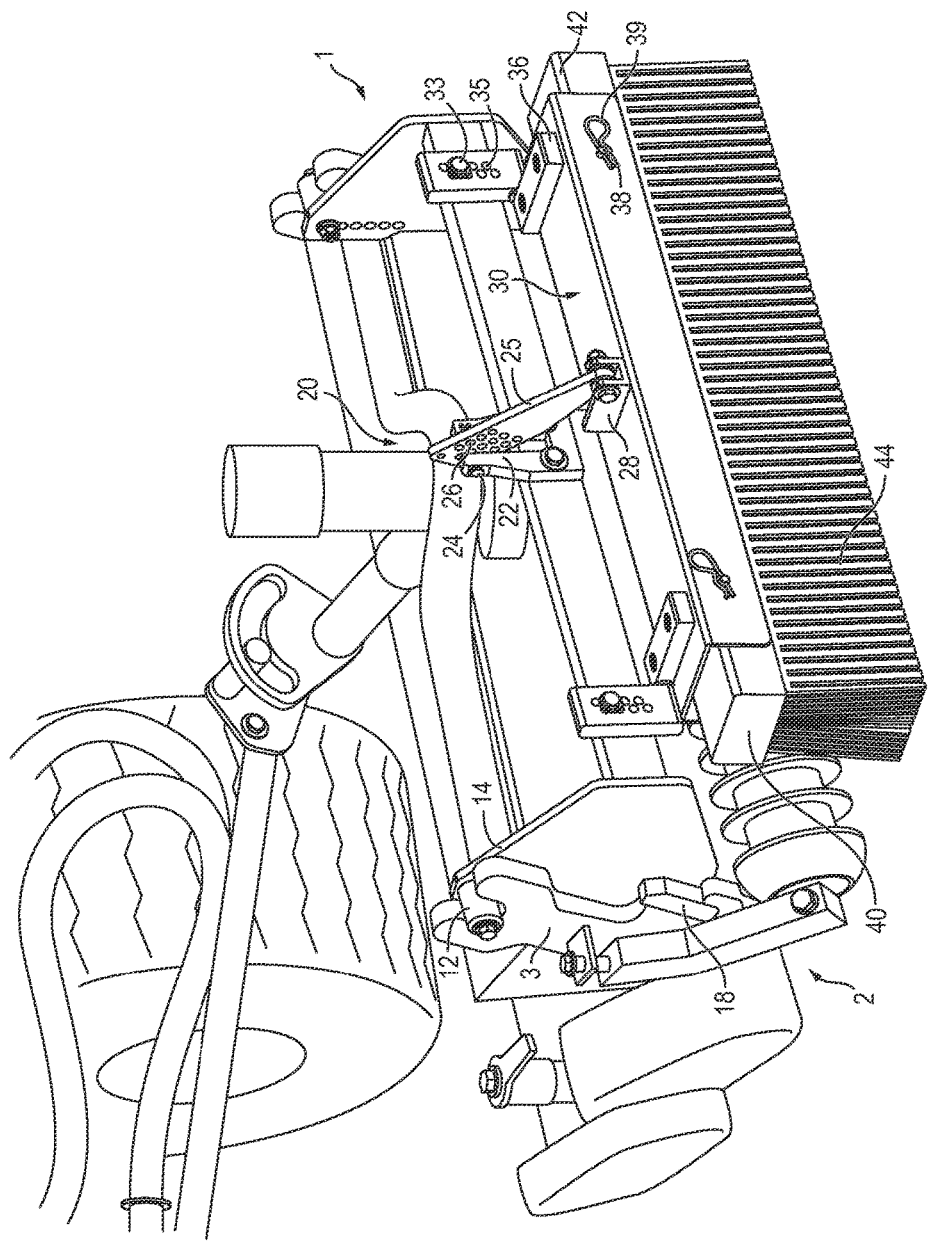
FIG. 3 is a perspective view of a first embodiment of a turfgrass brushing assembly coupled to a turfgrass mower cutting unit.

As previously referenced in this document, a turfgrass brushing assembly 1 may be pivotally mounted or otherwise coupled to a turfgrass mower cutting unit 2. For example, FIG. 3 depicts a non-limiting embodiment of a turfgrass brushing assembly 1 mounted in front of a turfgrass mower cutting unit 2 such that the brush 40 precedes the turfgrass mower cutting unit 2 in contact the turfgrass during use. According to some aspects, pivot couplings 12 may be mounted to yokes 12 that are standard in some turfgrass mower cutting units 2. In other embodiments, pivot coupling 12 may be mounted in custom yokes made especially for the turfgrass brushing assembly or pivotally coupled within comprising opposing open ends on the mower cutting unit 2. When pivotally mounted to a yoke 3, tubes, or mounts on a mower cutting unit, a turfgrass brushing assembly 1 is then able to pivot relative to the mower cutting unit 2 by pivoting about the pivot couplings 12. A turfgrass brushing assembly 1 may be adjusted vertically relative to the mower cutting units 2 by selecting among the available holes 16 in the side plates 14. In some embodiments, a tractor 4 or other device may push a plurality of turfgrass brushing assemblies 1 pivotally coupled to a plurality of turfgrass mower cutting units 2. For example, in the non-limiting embodiment shown in FIG. 6, a tractor 4 is depicted pushing three brushing assemblies 1, each brushing assembly 1 pivotally coupled to a different turfgrass mower cutting unit 2. This configuration allows for more efficient and customized turfgrass brushing to meet the needs of the operator.

Figure 4:
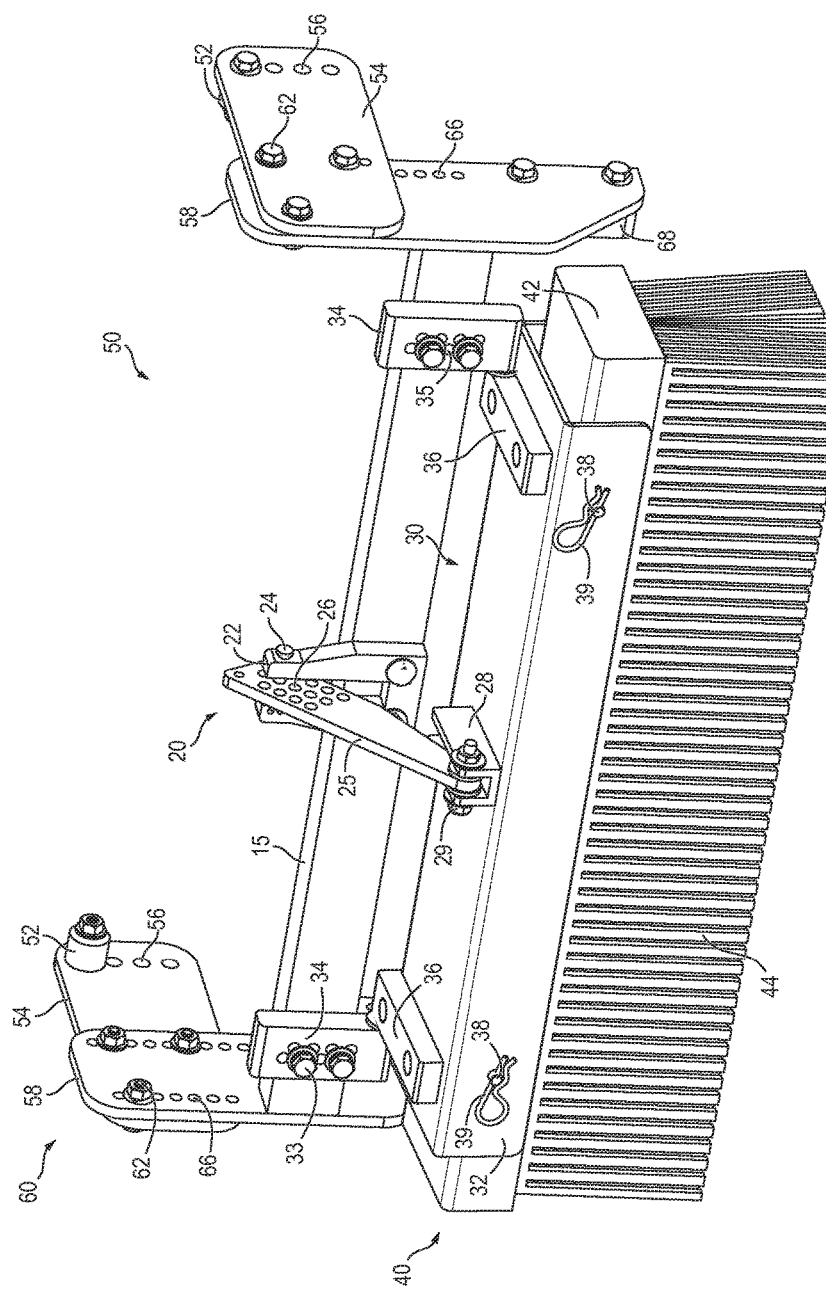
FIG. 4 is a perspective view of a second embodiment of a turfgrass brushing assembly.
Figure 5:
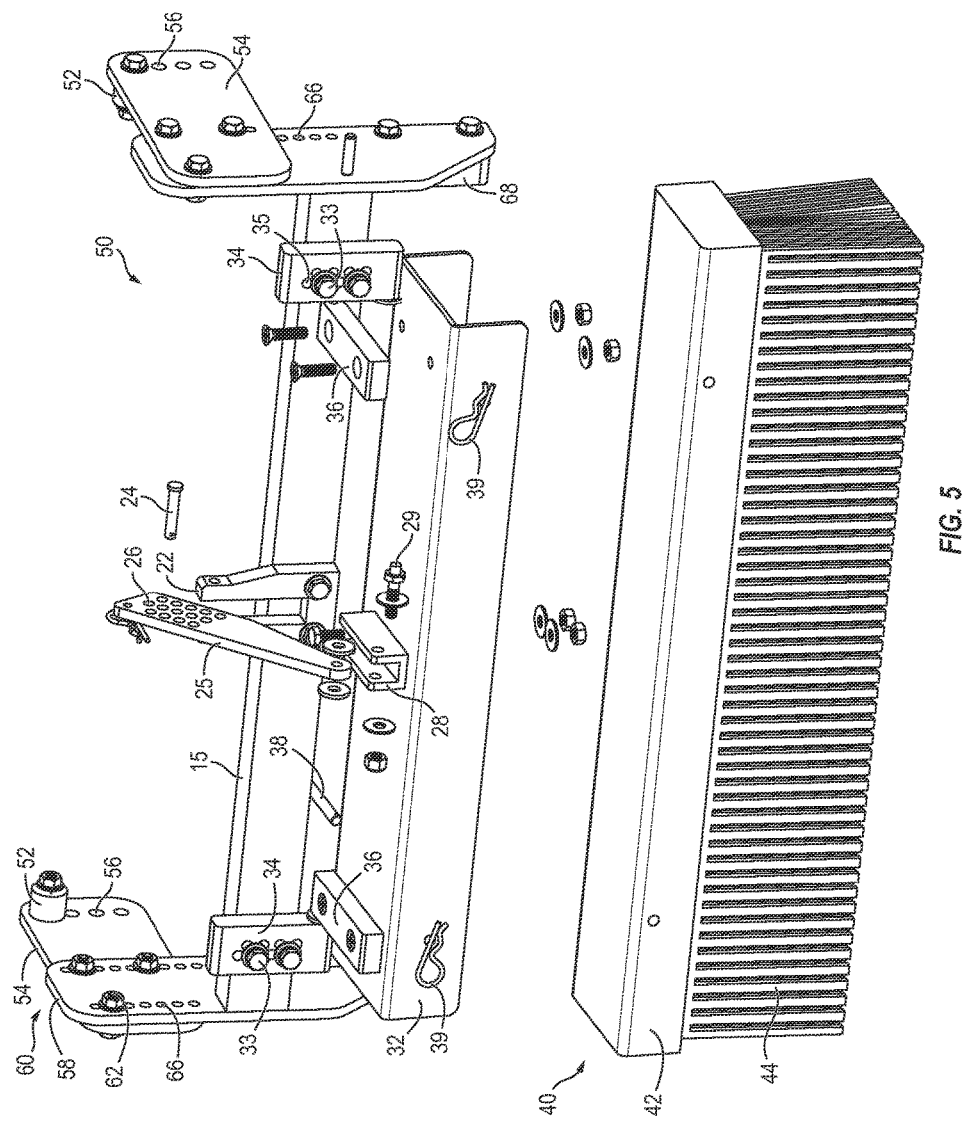
FIG. 5 is an exploded view of a second embodiment of a turfgrass brushing assembly.

FIGS. 4 and 5 depict another non-limiting embodiment of a turfgrass brushing assembly 50. Unless otherwise specified, a turfgrass brushing assembly 50 comprises parts, elements, and descriptions provided above in relation to turfgrass brushing assembly 1. For example, a turfgrass brushing assembly 50 may comprise a brushing assembly 30, an angle adjustment assembly 20, vertical adjusters 34, and the like similar to those described in relation to the turfgrass brushing assembly 1. Furthermore, it is contemplated that aspects of a turfgrass brushing assembly shown in relation to the turfgrass brushing assembly 1 may be applied to a turfgrass brushing assembly 50, and vice versa, without departing from the scope of this disclosure.

In one or more embodiments, a frame assembly 60 of a turfgrass brushing assembly 50 comprises a cross member 15, two opposing first side plates 54, and two opposing second side plates 58. According to some aspects, the two opposing second side plates 58 are coupled to the cross member 15 distal one another. The second side plates 58 may be welded, fixedly coupled, or removably coupled with any suitable coupling known in the art. According to some aspects, the second side plates 58 are height adjustable coupled to the cross member 15. Each second side plate 58 may further comprise a bumper 68 or contact point coupled to the second side plate 58. In some embodiments, the bumper 68 is removably coupled to second side plate 58 below the cross member 15, and may be removably coupled to the second side plate 58 and positioned on either an inward facing surface or an outward facing surface of the second side plate 58. In the non-limiting embodiment shown in FIGS. 4 and 5, the bumper 68 is removably coupled to an inward facing surface of a second side plate 58. The bumper 68 is positionable as a contact point with parts of the turfgrass mower cutting unit 2 to prevent the turfgrass brushing assembly 50 from pivoting too far towards the turfgrass more cutting unit 2. Each second side plate 58 may further comprise a plurality of holes 66 positioned receive one or more couplings 62 for adjustable and removable coupling of the first side plate 54 to the second side plate 58. In some embodiments, the holes 66 extend through the second side plate 58 and are distal the bumper 68.

A frame assembly 60 of a turfgrass brushing assembly 50 may further comprise two first side plates 54 each removably and adjustably coupled a different second side plate 58. For example, in the non-limiting embodiment shown in FIGS. 4 and 5, each first side plate 54 is removably and height adjustably coupled to a different second side plate 58 with bolts 62. Each first side plate 54 may comprise one or more holes positioned to align with one or more holes 66 of the second side plate 58 for coupling of the first side plate 54 and the second side plate 58 together. In other embodiments, each first side plate 54 is fixedly coupled a different second side plate 58.

Each first side plate 54 of a frame assembly 60 may further comprise one or more holes 56 distal the second side plate 58 configured to allow removable coupling of a pivot coupling 52 to the first side plate 54. In the non-limiting embodiment shown in FIGS. 5 and 6, each first side plate 54 comprises a plurality of holes 56 positioned for removable and height adjustable coupling of the pivot coupling 52 to the first side plate 54. The pivot coupling 52 may comprise any of the materials, shapes, and configurations of pivot couplings 52 described elsewhere in this document, and may be moveable to couple to either an inward facing surface of the first side plate 54 (shown in FIGS. 4 and 5) or an outward facing surface of the first side plate 54.

Also contemplated as part of this disclosure are various methods for brushing turfgrass. According to some aspects, a method of brushing turfgrass comprises pivotally coupling one or more turfgrass brushing assemblies 1 to one or more turfgrass cutting units 2 in front of the one or more turfgrass cutting units 2 with one or more pivot couplings 12 on a frame assembly 10 of each of the one or more turfgrass brushing assemblies 1. A method may further comprise pushing the one or more turfgrass brushing assemblies 1 across turfgrass by pushing the one or more turfgrass cutting units 2 to brush the turfgrass with one or more brushes 40, each of the one or more brushes 40 being coupled to a brush holder assembly 30 adjustably coupled to the frame assembly 10 of a different one of the one or more turfgrass brush assemblies 1.

A method may further comprise vertically adjusting a height of the turfgrass brush 30 of each turfgrass brushing assembly 1 by removing a coupling 33 from one hole 35 of a plurality of holes 35 on a vertical adjuster 34 pivotally coupled to the brush holder assembly 30 and inserting the coupling 33 into a different one of the plurality of holes 35 of the vertical adjuster 34 to couple the vertical adjuster 34 and the brush holder assembly 30 to the frame assembly 10. According to some aspects, a method may further comprise adjusting an angle of the brush holder assembly 30 of the turfgrass brushing assembly 1 by removing a coupling 24 from one hole of a plurality of holes 26 in a linkage arm 25 and a fork 22 coupled to the frame assembly 10, the linkage arm 25 being pivotally coupled to the brush holder assembly 30 distal the plurality of holes 26 in the linkage arm 25, and inserting the coupling 24 through the fork 24 and a different hole of the plurality of holes 26 of the linkage arm 25.

A method may further comprise adjusting a height of the turfgrass brushing assembly 1 by detaching the pivot coupling 12 from one hole of a plurality of holes 16 on a side plate 14 of the frame assembly 10, and reattaching the pivot coupling 12 to a different hole of the plurality of holes 16 on the side plate 14 of the frame assembly 10. According to some aspects, pivotally coupling the one or more turfgrass brushing assemblies 1 to the one or more turfgrass cutting units 2 in front of the one or more turfgrass cutting units 2 with the one or more pivot couplings 12 on the frame assembly 10 of each of the one or more turfgrass brushing assemblies 1 comprises inserting opposing bushings 12 of the one or more turfgrass brushing assemblies into two opposing yokes 3 of the one or more turfgrass cutting units 2.

It will be understood that implementations are not limited to the specific components disclosed herein, as virtually any components consistent with the intended operation of a method and/or system implementation for a turfgrass brushing device may be utilized. Accordingly, for example, although particular turfgrass brushing devices may be disclosed, such components may comprise any shape, size, style, type, model, version, class, grade, measurement, concentration, material, weight, quantity, and/or the like consistent with the intended operation of a method and/or system implementation for a turfgrass brushing device may be used.

In places where the description above refers to particular implementations of turfgrass brushing devices, it should be readily apparent that a number of modifications may be made without departing from the spirit thereof and that these implementations may be applied to other turfgrass brushing devices. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A turfgrass brushing assembly, comprising:
   a frame assembly configured to removably couple to a mower cutting unit, the frame assembly comprising one or more pivot couplings configured to pivotally couple the turfgrass brushing assembly to the mower cutting unit, a cross member, and two vertical adjusters; and
   a brush holder assembly adjustably coupled to the frame assembly, the brush holder assembly comprising a brush block coupling, a brush removably coupled to the brush block coupling, and two swivel blocks coupled to the brush block coupling and pivotally coupled to the frame assembly;
   wherein each of the two vertical adjusters is removably coupled to the cross member with a coupling extending through one of a plurality of holes positioned to allow a user to vertically adjust a height of the vertical adjuster and the brush holder assembly by extending the coupling through one of the plurality of holes.

2. The turfgrass brushing assembly of claim 1, further comprising an angle adjustment assembly coupled to the brush holder assembly and the frame assembly, the angle adjustment assembly being configured to adjust a relative angle of the brush, and wherein the frame assembly further comprises two opposing side plates each coupled to a different end of the cross member, each side plate of the two opposing side plates being coupled to a different one of the one or more pivot couplings configured to pivotally couple to a mower cutting unit.

3. The turfgrass brushing assembly of claim 2, wherein each pivot coupling comprises a bushing and the frame assembly further comprises a bumper coupled to each side plate.

4. The turfgrass brushing assembly of claim 2, wherein the angle adjustment assembly comprises:
   a pivot channel coupled to the brush block coupling of the brush holder assembly;
   a linkage arm pivotally coupled to the pivot channel at a first end of the linkage arm, the linkage arm comprising a plurality of holes distal the first end of the linkage arm;
   a fork coupled to the cross member of the of the frame assembly and removably coupled to the linkage arm with a pin that extends through a portion of the fork and through one of a plurality of holes on the linkage arm, wherein the relative angle of the brush is adjusted responsive to extending the pin through different holes of the plurality of holes of the linkage arm.

5. The turfgrass brushing assembly of claim 1, wherein the brush block coupling comprises a U-shaped bracket, and the brush is coupled to the U-shaped bracket with one or more brush pins.

6. The turfgrass brushing assembly of claim 1, wherein the one or more pivot couplings is two pivot couplings.

7. The turfgrass brushing assembly of claim 6, wherein the two pivot couplings extend toward each other.

8. The turfgrass brushing assembly of claim 6, wherein the two pivot couplings extend away from each other.

* * * * *